A. MELIDONA.
AUTOMOBILE FRAME.
APPLICATION FILED NOV. 20, 1920.
1,423,240.
Patented July 18, 1922.
4 SHEETS—SHEET 1.
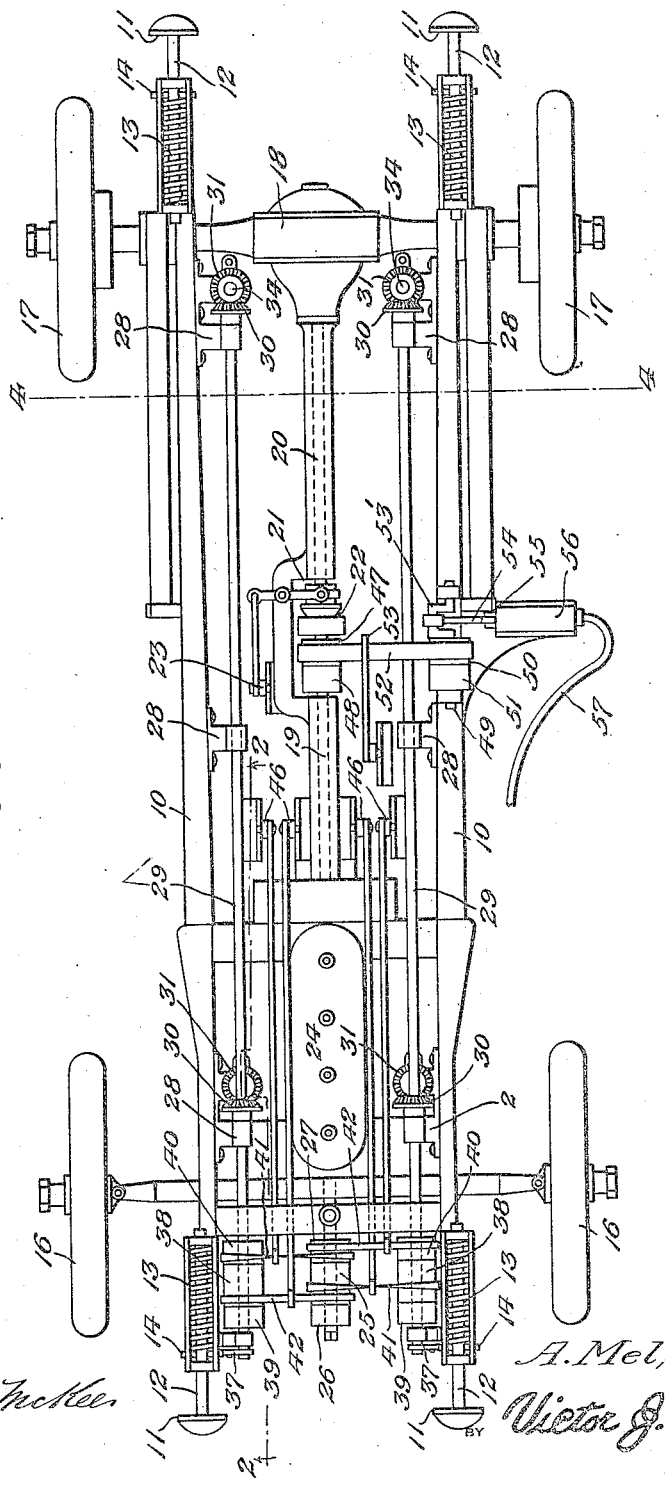

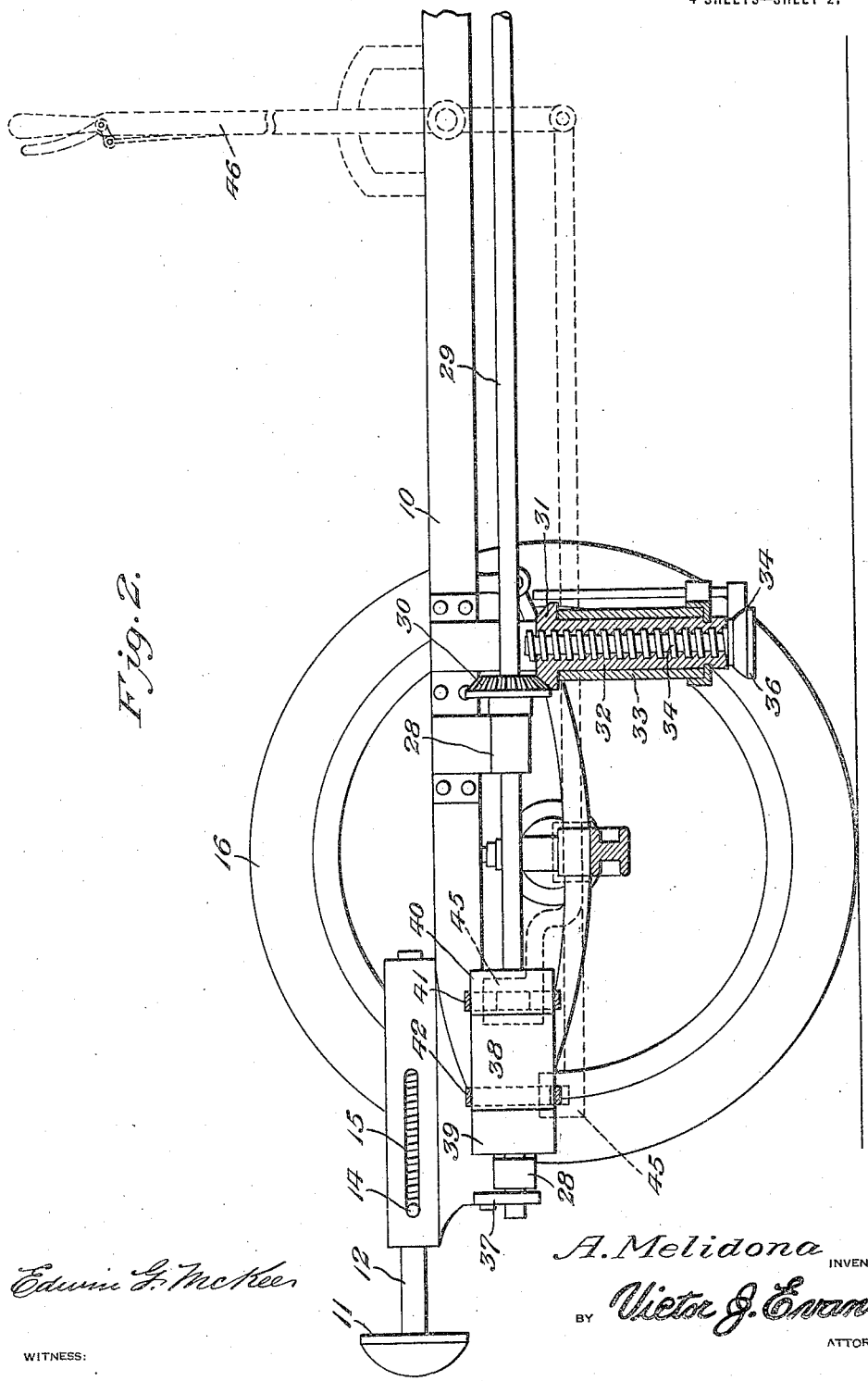

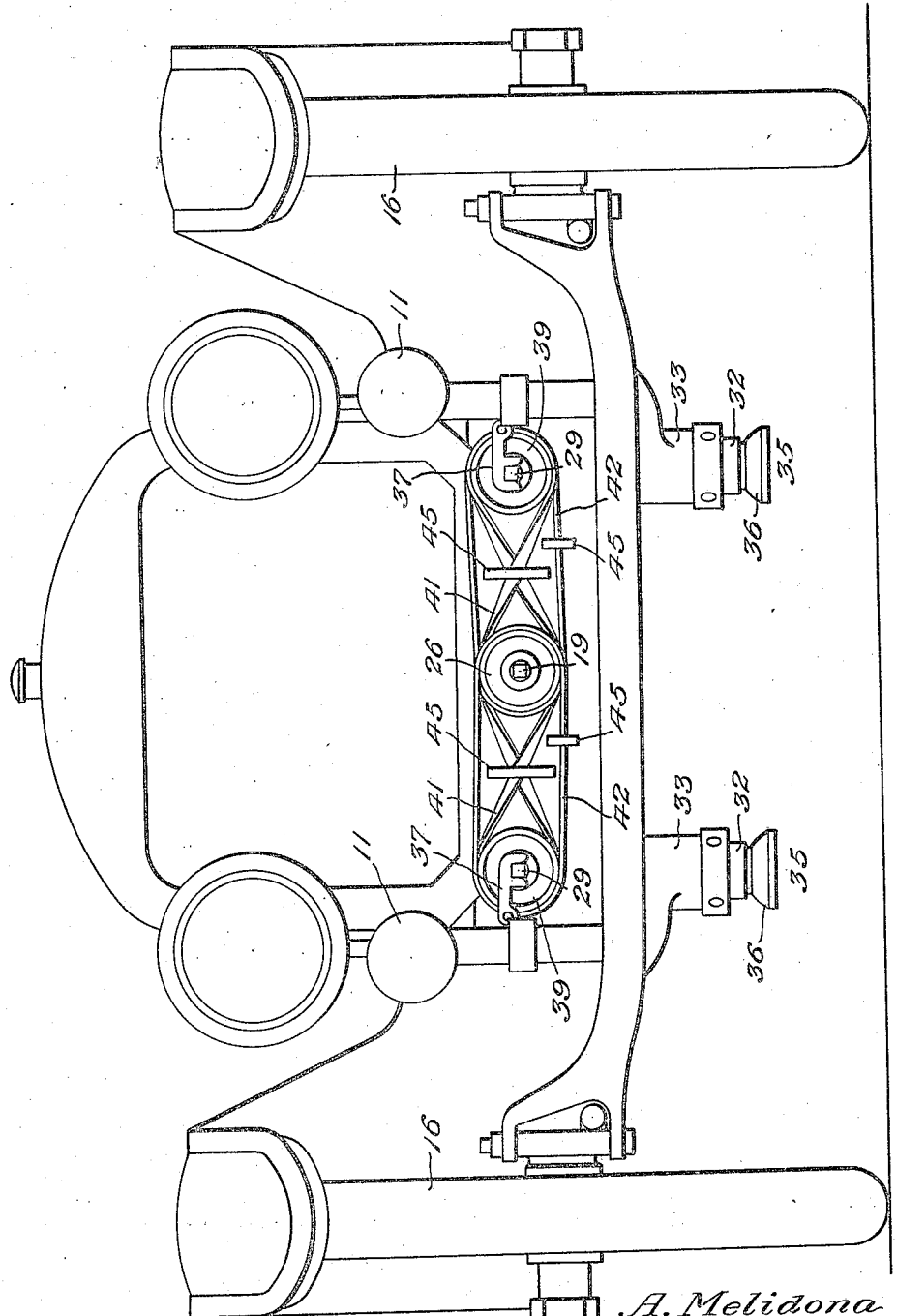

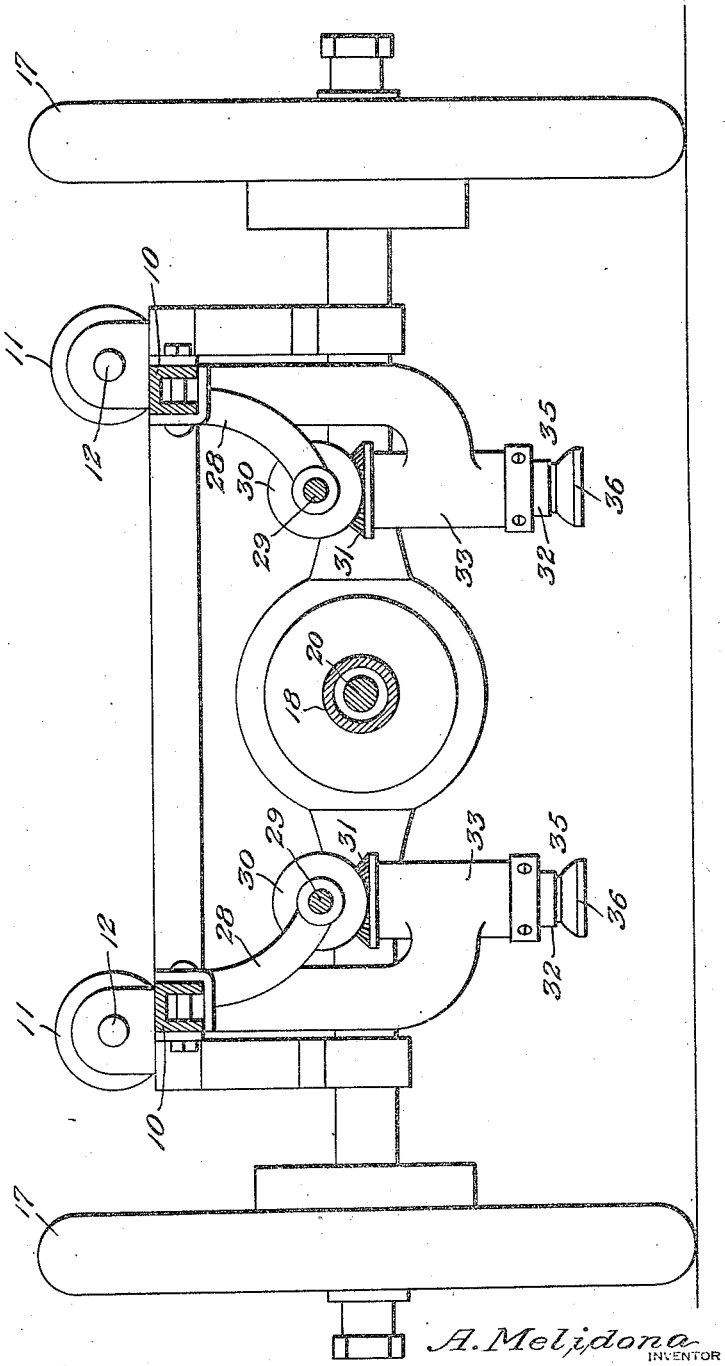

UNITED STATES PATENT OFFICE.

ANTONIO MELIDONA, OF NIAGARA FALLS, NEW YORK.

AUTOMOBILE FRAME.

1,423,240. Specification of Letters Patent. Patented July 18, 1922.

Application filed November 20, 1920. Serial No. 425,455.

*To all whom it may concern:*

Be it known that I, ANTONIO MELIDONA, a citizen of Italy, residing at Niagara Falls, in the county of Niagara and State of New York, have invented new and useful Improvements in Automobile Frames, of which the following is a specification.

This invention has reference to automobiles and is particularly directed to the frame and power plant thereof.

An object is to produce an automobile having jacks associated with the frame thereof and operated by the driving power of the machine, whereby said jacks may be brought to ground contacting position to elevate the wheels of the machine above the ground either when repairs are to be made to the machine or when the machine is stored to relieve the tires from the weight of the body of the machine.

It is a further object of the invention to provide an automobile frame with jacks which are operated by the driving mechanism of the automobile when the said jacks are required for use, and which will in no wise interfere with the driving or travel of the machine when said jacks are not required for use.

It is a still further object to produce an automobile frame in which spring influenced buffer members are provided at the ends of the side frame members, and in which vertically movable jacks are associated with the said side frame members, means driven by the engine of the machine being provided for operating the jacks to raise or lower the same, and means being also provided by the engine drive for actuating a pump provided with a flexible hose and whereby the tires of the machine may be inflated when desired.

The foregoing objects and others which will appear as the nature of the invention is better understood, may be accomplished by a construction, combination and operative arrangement of parts such as is illustrated by the drawings.

In the drawings:—

Figure 1 is a plan view of the improvement.

Figure 2 is an enlarged sectional view on the line 2—2 of Figure 1.

Figure 3 is a front elevation.

Figure 4 is a sectional view on the line 4—4 of Figure 1.

My improved automobile frame includes the usual side frame members 10 which, in the present instance have at their ends spring buffers. Each of the buffers comprises a member having a head 11 and a shank 12. The head is preferably provided with a facing of compressible material, and the shank 12 passes through an elongated longitudinal opening in the ends of the frame members 10. On the shanks and exerting a tension between the heads thereof and the ends of the said frame members are coil springs 13. The outward movement of the buffer members by the springs is limited by the contact of transverse studs 14, on the shanks, with side walls provided with elongated slots 15 which are arranged longitudinally to the sides of the frame members 10 and which communicate with the openings that receive the shanks 12 therein. By this arrangement it will be seen that the parts of the automobile will be amply protected should the same contact with an obstacle, and in this connection it should be stated that if found desirable a cross piece may connect the oppositely disposed heads of the end buffer members.

Beneath the frames, supported in the usual manner, are the axles for the front wheels 16 and rear or drive wheels 17. The rear drive wheel shaft is enclosed in the usual housing, the said shaft being centrally provided with the usual differential that is operated by the pinion on the drive shaft from the motor, and the pinion drive shaft is enclosed in the usual housing 18. In the present instance the pinion drive shaft comprises two sections 19 and 20 respectively. The housing 18 is cut away at a suitable distance from the engine and at the said end of the housing is a casing 21 in which is arranged a clutch 22. The clutch is operated by a lever 23. By shifting the lever in one direction the drive sections 19 and 20 will be connected, and by shifting the lever to another position the sections 19 and 20 will be disconnected so that the section 19, which is connected directly to the engine 24 will turn without influencing the section 20 to which the drive pinion for the differential is secured.

In the present instance the drive shaft section 19 projects a suitable distance from the front of the engine, and on this extending end of the said shaft there is a central elongated loose pulley 25 and fixed pulleys 26 and 27 disposed to the opposite sides of the loose pulley.

On the side frame members 10 there is a plurality of spaced brackets 28. These brackets have bearings for longitudinally arranged shafts 29, the said shafts being arranged in parallelism with each other and in parallelism with the respective side frame member 10. Each of the shafts 29 has keyed thereon two spaced beveled pinions 30. The pinions 30 mesh with similar pinions 31. The pinions 31 are preferably secured to sleeves 32, the said sleeves being journaled in bearings 33 on the side frame members 10, and are held against vertical movement in their said bearings in any desired or preferred manner, such for instance as providing the sleeves with annual depressions and the bearings with projections which extend into the depressions. The bores of the sleeves are threaded and the said threads are engaged by the threaded shanks 34 of the jack members 35.

By reference to the drawings it will be noted that the respective pairs of oppositely opposed jacks 35 are located adjacent to the front and to the rear of the frame, and the lower ends of the threaded shanks of the jacks have swiveled thereto headed elements 36. When these elements are brought to engage with the ground the jack shanks can be turned and the frame elevated to bring the wheels 16 and 17 out of ground contacting position. The shafts 29 are revoluble in two directions, as will presently be more fully set forth, so that the jack may be either raised or lowered as desired.

Preferably to hold the shafts 29 against accidental turning when the jacks are raised or lowered I provide removable locking means 37 between the shafts and the front brackets 28. The locking means may be in the nature of pivoted elements having sockets on the outer face thereof which are brought over the squared ends of the shafts 29, and suitable catches may be provided for holding the locks in engagement with the shafts as well as out of such engagement.

On the front ends of the shafts 29 are elongated loose pulleys 38 and fixed pulleys 39 and 40 disposed to the ends of the loose pulleys. These pulleys are arranged directly opposite the fixed and loose pulleys of the drive shaft section 19. Normally arranged over the oppositely disposed loose pulleys of the drive and jack operating shafts are belts. Two of these belts are twisted and are indicated by the numeral 41 the remaining pairs of belts being straight and being designated by the numeral 42. For the belts I provide shifting means. Each of these shifting means includes belt engaging heads 45 to which are connected pivoted upstanding levers 46. By swinging one series of levers 46 the straight belts will be brought from the loose pulleys say on to the fixed pulleys 39 of the jack operating shafts 29 and the fixed pulley 26 of the drive shaft 19. This will cause the shafts 29 to turn in the same direction, and consequently lower the jacks. By bringing the twisted belts to engage with the second series of fixed pulleys the shafts 29 will be turned in the opposite direction, causing the jacks to be brought to a raised position. It is, of course, to be understood that the clutch 22 is operated to disconnect the engine shaft sections 19 and 20 when the jack shafts are operated.

On the drive shaft section 19, to the rear of the engine 24 is a fixed pulley 47 and a loose pulley 48. On one of the side frame members 10 there are uprights providing bearings for a short or counter-shaft 49. On the shaft 49 is a fixed pulley 50 and a loose pulley 51. Normally arranged around the loose pulleys 51 and 48 is a belt 52. The numeral 53 designates a belt shifter, substantially similar to that previously described. By operating the belt shifter the belt 52 may be brought to the loose pulleys, thus causing the turning of the shaft 49 with the shaft section 19. The counter-shaft 49 has an offset or crank portion 54′. To this crank 53 is connected a link 54. The link is in turn connected with the plunger rod 55. The plunger rod works a plunger in a pump cylinder 56. Connected with the pump cylinder is a valved flexible tube 57. This tube is of a length to permit of the valved outlet end thereof being connected with either the front or rear tires of the machine, and the provision of the pump permits of the tires being inflated in an easy and convenient manner even when the machine is at a distance from a service station.

It is thought that the foregoing description, when taken in connection with the drawings will fully set forth the operation and advantages of the construction without further detail description.

If desired, the front mud guards may be so shaped as to have the head lamps embedded therein, while safety springs and bars may be positioned at the front and rear of the machine between the axles and the body thereof, as may be springs between the wheel and axle. Also suitable electrically operated means may be provided for notifying the chauffeur when the mechanism is in operation.

Having thus described the invention, what I claim is:—

1. In a device for the purpose set forth, the combination with the frame and power plant of an automobile in which the drive shaft between the engine and differential is constructed of two sections, clutch means for connecting or disconnecting the sections, and said drive shaft projecting beyond the front of the frame, of fixed and loose pulleys on said projecting end of the shaft, shafts journaled in bearings along the sides of the frame having fixed and loose pulleys disposed opposite the first mentioned pulleys, belts trained around all of the pulleys, means for shifting the belts from the loose to the fixed pulleys, and screw jacks operated by the last mentioned shafts when the same are rotated.

2. In a device for the purpose set forth, the combination with the frame and power plant of an automobile in which the drive shaft between the engine and differential is constructed of two sections, clutch means for connecting or disconnecting the sections, and said drive shaft projecting beyond the front of the frame, of fixed and loose pulleys on said projecting end of the shaft, shafts journaled in bearings along the sides of the frame having fixed and loose pulleys disposed opposite the first mentioned pulleys, belts trained around all of the pulleys, means for shifting the belts from the loose to the fixed pulleys, and screw jacks operated by the last mentioned shafts when the same are rotated, and means between the frame and the ends of the last mentioned shaft for holding the same from accidental turning.

In testimony whereof I affix my signature.

ANTONIO MELIDONA.